United States Patent
Schoenemann

(10) Patent No.: US 10,007,783 B2
(45) Date of Patent: Jun. 26, 2018

(54) METHOD FOR PROTECTING AN AUTOMATION COMPONENT AGAINST PROGRAM MANIPULATIONS BY SIGNATURE RECONCILIATION

(71) Applicant: Siemens Aktiengesellschaft, Munich (DE)

(72) Inventor: Peter Schoenemann, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 98 days.

(21) Appl. No.: 14/813,503

(22) Filed: Jul. 30, 2015

(65) Prior Publication Data

US 2016/0034688 A1 Feb. 4, 2016

(30) Foreign Application Priority Data

Jul. 30, 2014 (DE) .................. 10 2014 214 934

(51) Int. Cl.
| | |
|---|---|
| H04L 29/06 | (2006.01) |
| G06F 21/55 | (2013.01) |
| G05B 19/042 | (2006.01) |
| G05B 19/05 | (2006.01) |
| G06F 21/52 | (2013.01) |
| G06F 21/56 | (2013.01) |

(52) U.S. Cl.
CPC ....... *G06F 21/552* (2013.01); *G05B 19/0428* (2013.01); *G05B 19/058* (2013.01); *G06F 21/52* (2013.01); *G06F 21/566* (2013.01); *H04L 63/0227* (2013.01); *G05B 2219/24042* (2013.01); *G05B 2219/24119* (2013.01); *G05B 2219/24125* (2013.01); *G06F 2221/033* (2013.01)

(58) Field of Classification Search
CPC .................................. G06F 12/00; H04L 9/00
See application file for complete search history.

(56) References Cited

U.S. PATENT DOCUMENTS

| | | | |
|---|---|---|---|
| 6,424,258 B1 | 7/2002 | Claes | |
| 2001/0039579 A1* | 11/2001 | Trcka | G06F 21/552 |
| | | | 709/224 |
| 2003/0188174 A1 | 10/2003 | Zisowski | |
| 2007/0043951 A1 | 2/2007 | Grill et al. | |
| 2008/0109730 A1* | 5/2008 | Coffman | G06Q 30/02 |
| | | | 715/733 |

(Continued)

FOREIGN PATENT DOCUMENTS

| | | |
|---|---|---|
| CN | 101866407 A | 10/2010 |
| WO | 2012019659 A1 | 2/2012 |
| WO | 2014109645 A1 | 7/2014 |

*Primary Examiner* — Joseph P Hirl
*Assistant Examiner* — Leynna Truvan
(74) *Attorney, Agent, or Firm* — Schiff Hardin LLP

(57) ABSTRACT

In a method for determining a threat situation for an automation component of the controller or field level, wherein the automation component has at least one essentially cyclic program behavior, a number of required program behaviors is established in a learning phase in a processor, and the determined required program behaviors are stored and compared cyclically with actual program behaviors, that are established in operation of the automation component. The result of the comparison is logically linked with results of other security components for verification as to whether a threat situation exists.

13 Claims, 2 Drawing Sheets

(56) References Cited

U.S. PATENT DOCUMENTS

2008/0235473 A1    9/2008   Hofmann et al.
2013/0061328 A1    3/2013   Mendel et al.
2013/0304238 A1   11/2013   Seyller et al.

\* cited by examiner

METHOD FOR PROTECTING AN AUTOMATION COMPONENT AGAINST PROGRAM MANIPULATIONS BY SIGNATURE RECONCILIATION

BACKGROUND OF THE INVENTION

Field of the Invention

The invention concerns a method for protecting an automation component against program manipulations by determining a threat situation of the automation component.

Description of the Prior Art

Automation systems in factory automation are composed of a series of different automation components, essentially at the control and field level, such as programmable logic controllers, for example. The term automation component in such cases is understood as encompassing any intelligent field or control component equipped with software, and to this extent drive, monitoring and/or sensor components are also encompassed by the term. The automation components are generally networked with one another and are operated and/or monitored by different hierarchically-arranged, superordinate controllers. The hierarchical superordinate control levels are known as operator level, management level or enterprise level.

Increasingly, even automation components at the control and field level are becoming the target of so-called cyber attacks and program manipulation, which could have effects on the control of a production process for example. A series of safety components are known, which largely prevent intrusion into the automation system as a whole, or at least are designed to recognize such an intrusion. Usually these are single, stand-alone measures that increase the industrial safety of automation components, but which are neither sufficient on their own to guarantee comprehensive manipulation protection, nor is it known how to combine these safety components in a suitable manner. Thus automation components with integrated security functions currently offer a certain protection from program modifications. Known and already integrated protection mechanisms are know-how protection, copy protection or access protection. To the extent that manipulation protection is to be guaranteed, this protection relates only to the transmission of data in the aforementioned superordinate levels from and to the HMI (Human Machine Interface). Even these protection mechanisms can be bypassed with sufficient effort (e.g. brute force). If a program modification still occurs despite this protection effort, the program manipulations—namely the modifications of the process behavior—are not able to be recognized with such means.

Also known are SIEM (Security Information and Event Management) solutions, which are integrated into automation environments. In these solutions, security-relevant characteristic variables are extracted from the components in order subsequently to be able to guarantee complex system protection with said variables. In such cases general information is collected via conventional protocols such as SNMP or Syslog and if necessary related to further information from security components. But here too a comprehensive access to all variables which describe the cyclic behavior of an automation component is not possible. Program manipulation is thus not able to be recognized.

SUMMARY OF THE INVENTION

An object of the invention is to provide a method that determines a threat situation for automation components, with which in a program manipulation in the automation component is reliably recognized.

The respective automation component essentially operates in accordance with the invention in a cyclic mode, as is known for example from programmable logic controllers. In such cases, by the operation of a program installed in the automation component, the process states at the inputs of the automation component are cyclically read in and the outputs of the automation component are output cyclically and in correlation with the cyclic reading-in. There is thus a process image for each process state at the input and at the output of the automation component. This process image during operation of the system is understood as the actual program behavior, because the program of the automation component creates a specific output process image for a specific input process image. In a first step in accordance with the inventive method, this actual process behavior is established or detected. Established or detected is understood, for example, as this actual program behavior being stored in a suitable manner with simultaneous detection of the respective time, in the form of a "fingerprint" or a first signature in a file of a suitable format. However, it is also possible for the actual program behavior not to be stored in a file, but instead for the signature to be held in a memory, of the automation component for example. In a second step this first signature is now compared with a second signature, wherein this second signature corresponds to a required program execution. The required program execution is to be understood in such cases as the program execution that is expected for an automation component which is free from any manipulations. A number of required program executions are determined and stored, for example, before the actual monitoring takes place. The information can be stored in a suitable format, with the actual program execution being present in an identical format. A comparison between the actual and the required program executions can then take place, for example by so-called hash values of the two files being compared with one another, and thus it can be established whether the data actually differ. Other mechanisms for making a comparison between the files are likewise possible. Deducing a threat situation, i.e. whether a threat situation is present or not, is then undertaken in a next step through qualitative evaluation of the results of the comparison. If the actual program execution largely matches a stored program execution, then no threat is present. Conversely, in the event of an actual program execution not corresponding to any required program execution, a threat situation may be indicated. The term "largely matches" should be understood here as not necessarily requiring an absolute, 100% match, but that—depending on the individual case—a specific degree of deviation is permitted and yet a qualified statement about the threat situation can still be made.

In this way it is possible to continuously monitor the program behavior and quickly recognize program manipulations. With recognized deviations between first and second signature, it can be assumed that a modification has been made in the program, which in turn represents a symptom of a possible manipulation. Any required measures can be initiated, for example triggering an alarm and/or automatically putting the process into a secure state.

In accordance with another aspect of the invention, all required program behaviors are established in a learning phase by fuzzy logic and/or neural networks and/or simulation software, and the required program behaviors of the automation component thus established can be stored in the automation component itself or in the superordinate controller. The object is to learn the behavior of an automation component in its original and unmodified state, i.e. in its non-manipulated state, over a certain period of time, and to subsequently store this behavior as a second signature. In such cases, the type of individual modules concerned essentially has no role to play, provided the behavior has a cyclic execution sequence. The structure of fuzzy logic or neural networks as such is known and thus need not be described in greater detail herein. It is only necessary that all values and variables influencing the behavior of the automation components be considered. These are defined in advance and are integrated into the logic. A possible way of empirically determining the required program behavior is to use simulation software. With such simulation software, it is possible to relatively easily establish and store the required program behavior, even before the delivery of a system. Similarly it is then possible, with desired modifications—for example during a subsequent service deployment—to learn the modified required program execution again, i.e. to create and store a new signature for the program execution relating to this modification.

In one embodiment, the established required program behavior is stored in the automation component. This is especially advantageous because the intelligence is thus relocated to the control and field level and thus each automation component can signal a manipulation attempt by itself. At the same time the data traffic in the industrial network bears hardly any additional load.

In another embodiment, the established required program behavior of the automation component is stored at a superordinate controller level. This is of advantage in the cases in which automation components are also to be linked into factory automation which often have no or only restricted options (memory space, processor power) for storing further processor and memory intensive functions there without negatively influencing the processing times for process control. Automation components of different manufacturers can also be integrated in this way. Mixed variants would likewise be possible.

In accordance with an important aspect of the invention, the required program behavior is stored such that, after the storage of the required program behavior, only read access is possible. This is because, to be able to guarantee the highest possible security, it should be insured that the signature of the required program execution sequence cannot be manipulated. Therefore, the signature should also be stored so that changes can only be made locally and not through a remote access. In this way it is insured that the required program behavior cannot be subjected to any modification from outside.

The cyclic establishing of the actual program behavior has an influence on the processor load and thus—where the procedures are running in the automation component—on the processing times for the process control and monitoring. Where the procedures are executing in the higher-ranking controllers, it has an additional influence on the network loading. Furthermore the sampling rate for establishing the actual program behavior is dependent on the type and usage of the automation component. Thus slow or sluggish processes do not need a disproportionately high sampling rate. It is therefore advantageous to design the time interval, the sampling rate for establishing the actual program behavior, to be adjustable. Preferably the sampling rate should be able to be adjusted in a range from 2 ms to 5 min.

In a further embodiment, the threat situation derived from the comparison is additionally linked to independently-established results for the threat situation of other security components. In this way, possible false alarms can advantageously be further reduced. In such cases the monitoring of the signatures of actual and required program behavior can be combined with a further solution, such as for example a SIEM (Security Information & Event Management) solution. A SIEM solution is independent of the solution previously proposed here for example. In this way possible behavior patterns of the automation component which could not be learnt and thus would entail a signature deviation would not establish any threat situation or signal a threat situation of lower priority, which for example would not entail any automatic intervention into the process. Conversely a signature deviation would be recognized during a comparison of actual and required program behavior, since a potential attack through a further security component has been recognized independently thereof, a high probability of true program manipulation at an automation component would also be assumed and countermeasures can be initiated quickly.

A further aspect of the invention is a non-transitory, computer-readable storage medium encoded with programming instructions that determine a threat situation of an automation component within a control and monitoring system. The term automation component includes all types of automation component, including so-called intelligent sensors or actuators or mixed forms of the two, which execute a processor-controlled and thus software-controlled preprocessing or evaluation of process or system data. The term automation component, as well as so-called programmable logic controllers, includes any type of intelligent field devices, for example motors, converters or the like. The programming instructions cause the processor or computer into which the storage medium is loaded to create a number of required program behaviors of the automation component. These required program behaviors define the intended normal behavior of the system, i.e. the output parameters or output signals of the relevant automation component to the process, based on the respective input parameters or input signals of the control and monitoring system, essentially of the respective automation component. Because of the changing conditions in operation of the control and monitoring system, changing input signals require other output signals for example, the entire program behavior is described by a number of individual required program behaviors, essentially each describing a process state. These normal process states are stored as required program behaviors in a suitable manner. This can be done during a so-called learning phase prior to the actual operation, in which all or at least the important process states are run or simulated. In a suitable manner the simulation software can support the learning phase. It would also be conceivable to accept required program states in certain phases of the actual operation, provided a threat of an attack or a manipulation of the program execution sequence by an attack can be excluded. Thus for example during such a phase an access to insecure, generally external networks, is physically prevented.

Through the programming instructions encoded in the storage medium, the current program behavior of the respective automation components is established cyclically in ongoing operation. Cyclic establishment is understood as being that, at a defined point in time the actual process state, i.e. the input parameters or input signals and the essentially corresponding output parameters or output signals of the respective automation component, are essentially detected in real time and are buffered in a suitable manner. The buffering can be done in such cases in volatile or non-volatile memories, generally magnetic memories. The actual process state is established repeatedly at specific intervals. After establishment of the actual process state a comparison is made with the required program behavior stored in the memory. The purpose of the comparison is to find a correspondence for the respective actual program behavior in the plurality of required program behaviors which are available in stored form. Corresponding methods for comparing different files are known for example. Thus, according to one method, the respective hash values of the files are compared with one another, provided there is to be a check for identity of the files. However, comparison methods are also conceivable that do not aim for identity, but allow a certain, non-critical deviation for the purposes of identification of a threat or manipulation situation. Based on the comparison between required program behavior and actual program behavior a threat situation is derived, wherein, if a deviation is determined, a manipulation of the system has already taken place as a rule, for which an alarm is signaled in a suitable manner.

To exclude false alarms where possible, it is especially advantageous to link the threat situation derived from the comparison additionally to independently-established results for the threat situation of other security components and subsequently only then the initiate an alarm if essentially a threat situation which has been recognized by other security components is also present at the same time.

Other security components are to be understood as known solutions such as for example the so-called SIEM (Security Information & Event Management) solution. Other solutions as are grouped together under the term "Integrated Security Function", for example protection mechanisms which are intended for copy or access protection, can be logically linked to the solution proposed here. Logical linkage in this context is primarily to be understood as the results, i.e. the alarm messages of the one or more other different security components, being logically combined with the alarm message of the inventively proposed solution and an alarm message only then being created if at least one alarm message in accordance with the inventive solution and an alarm message of another security component are present, wherein the presence of the at least two alarm messages should advantageously correlate temporally, i.e. occur within a time window to be defined.

The invention is not restricted to this one combination option and further suitable combination options are expressly included.

DESCRIPTION OF THE PREFERRED EMBODIMENTS

Figure 1:
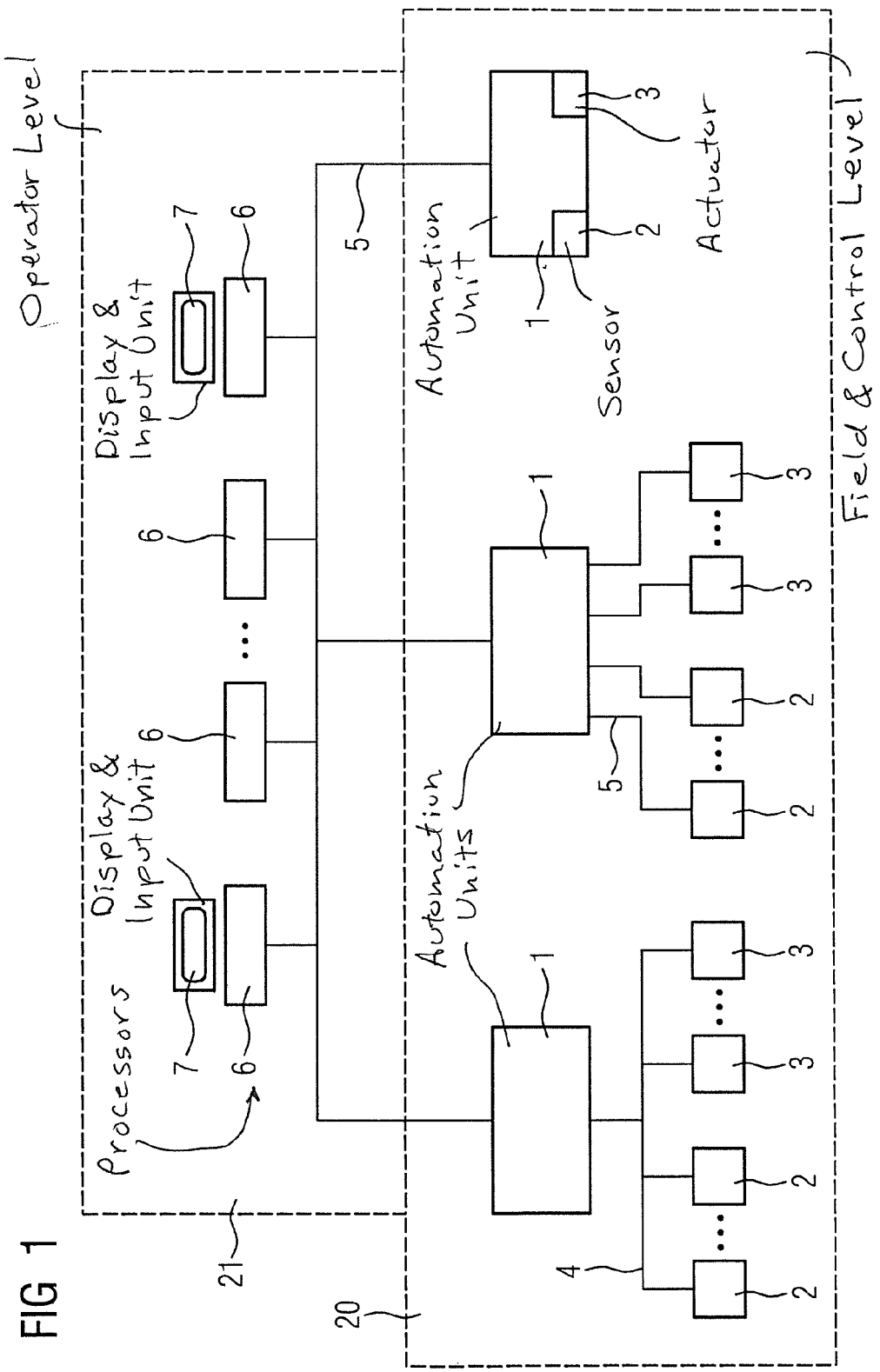
FIG. 1 is a block diagram of an automation system with field and control level and superordinate operator level.

FIG. 1 is a block diagram of a field and control level 20, above which an operator level 21 is arranged. Field and control level 20 and operator level 21 are connected to each other by an industrial communication network 5. The operator level has a number of processors 6, wherein all or some of the processors 6 can be linked to display and input units 7 in order to enter data and/or display data. The operator level 21 generally has further levels below it and these are linked to each other by a communication network; these further levels—not shown—are known as management level or enterprise level.

The control and field level 20 includes a number of automation components 1, wherein an automation component is to be understood as any type of intelligent field component, i.e. driven by or able to be influenced by means of software algorithms. Examples of such automation components are programmable controllers for monitoring and/or closed-loop or open-loop control tasks. Such field devices can also include—without being restricted thereto—motors or converters, provided these possess an intelligent communication interface and can be controlled and/or monitored by means of software. The automation components 1 can once again be connected to sensors 2 and/or actuators 3, in order to obtain data, such as for example switching states, pressures, temperatures etc. from the process or exert influence on the process for switching, open-loop control or closed-loop control. Such an effective connection can likewise be made via bus or network connections 4 as are known for example under the name Profibus or Profinet. Sensors 2 and actuators 3 can however also be connected individually via digital or analog hardware connections 5 to the automation components 1 or they are an integral component of an automation component 1 itself. The automation components 1 read in data cyclically from the sensors 2 and output control commands cyclically to the actuators as a result of the read-in data, as a result of operator commands of the user and/or a software algorithm stored in the automation component 1.

Figure 2:
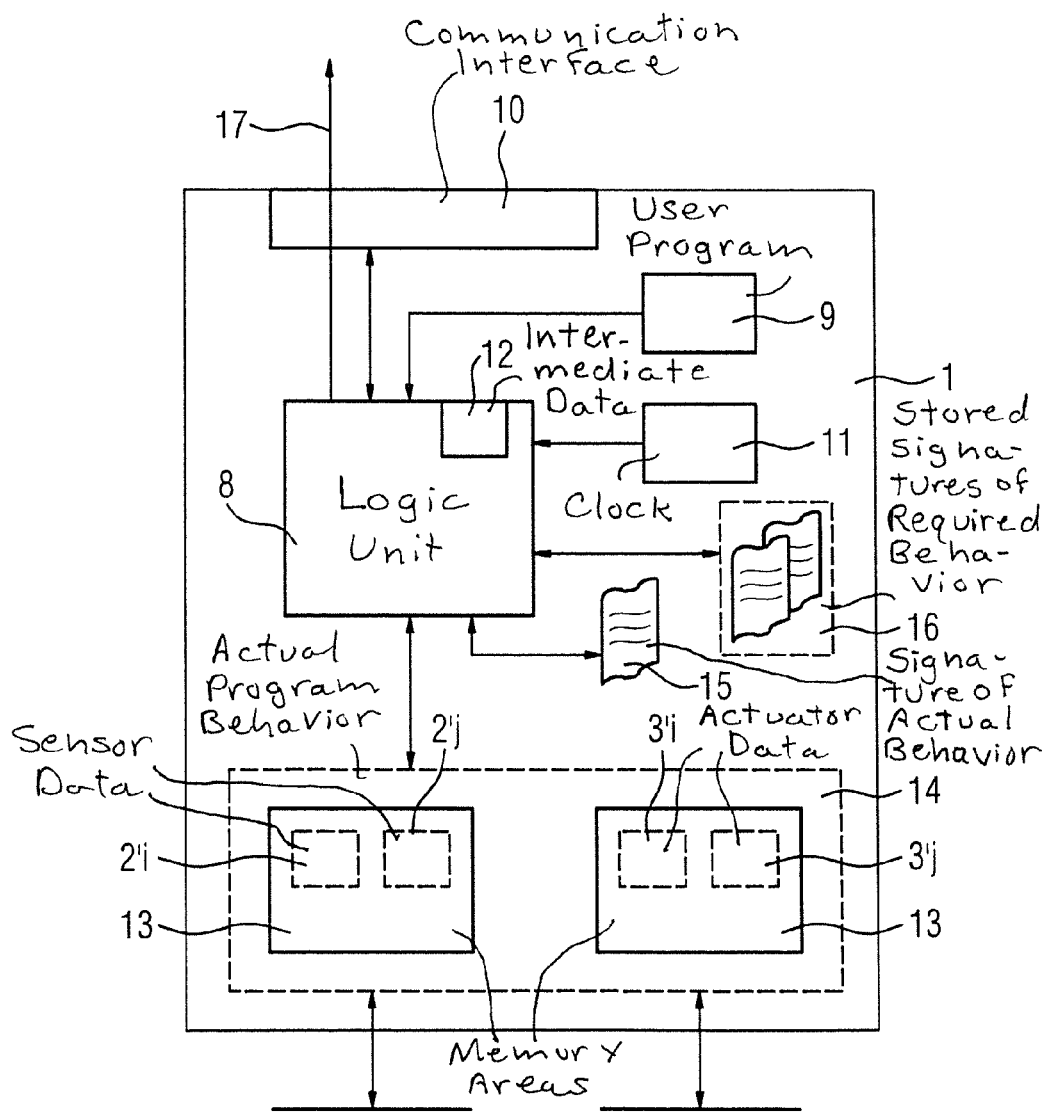
FIG. 2 is a block diagram/flowchart illustrating the inventive execution sequence within an automation component.
Figure 2:
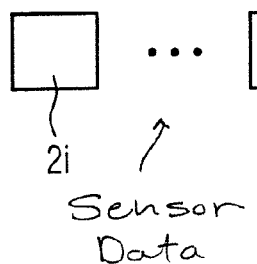
Figure 2:
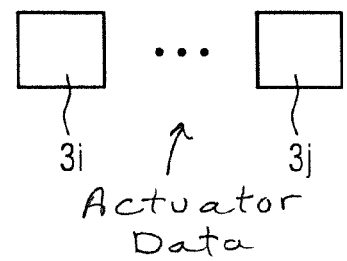

FIG. 2 illustrates the present invention in a schematic diagram. The automation component 1 includes a logic unit 8, wherein the logic unit 8 in the known way contains a computer architecture operating in real time including necessary memory units. The logic unit 8 processes the instructions of the user program 9. Via a communication interface 10 the logic unit is supplied with data of other automation components and/or data of the operator or provides data to the other components and/or to the operator. The logic unit 8 can be time synchronized by means of the clock 11. Located in memory areas 13 are the image $2'i$, $2'j$ of all relevant sensor data $2i$, $2j$ and the image $3'i$, $3'j$ of all relevant actuator data at a specific point in time. Thus the content of the memory area 13 defines an actual program behavior 14 at a specific point in time based on likewise known inputs of the operator and/or intermediate data 12 which the automation component creates in the logic unit 8 itself. This actual program behavior 14 at a specific point in time can be stored as a signature 15 in a suitable file format. In such cases the storage can take place within the logic unit 8 or, as depicted in FIG. 2, outside the logic unit 8. New signatures 15 are created at different points in time and/or for different process configurations.

A series of signatures 16—stored in a suitable format—which represent the required program behavior, lie in a memory area of the automation component 1. A number of signatures 16 were created in a learning phase and in each case represents a non-manipulated normal program behavior, in any event however the program behavior which can typically be expected.

When a signature 15 has been created, this signature is compared by the logic unit 8 with the signatures 16. Known hash functions can be employed for the comparison of files or signatures for example. A comparison of the signatures 15 and 16 can also be carried out in a separate logic unit within the automation components 1 or, if multicore processors are used, in a separate core. It is also possible for a comparison to be carried out at the superordinate operator level. In such a case the signatures 15 and 16 are also stored there for the automation component.

If it is established that the signature 15 cannot be assigned to any signature 16, i.e. if there is no match between the signature 15 and a signature 16, an alarm message 17 is generated in the respective logic unit (here logic unit 8) and thus a threat situation is notified to the superordinate operator level via the communication interface 10.

The logic unit 8 can—upon detection of a threat situation—also carry out an action itself and can cause the automation component and if necessary, via the communication interface 10, also further automation components, to switch to a previously defined, secure operation.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for operating an automation component in order to control a process that is external to said automation component, said method comprising:
   operating said automation component in a plurality of sequential cycles;
   providing a processor of said automation component with inputs, in each of said cycles, that represent a current process state of said process in that respective cycle;
   upon receipt of said inputs for said respective cycle, executing an internal program in said processor in order to apply said internal program to said inputs for said respective cycle, and in order to then generate outputs that represent a generated cycle behavior of said automation component in that respective cycle;
   in a memory of said automation component, storing a plurality of sets of stored inputs, with each set of stored inputs correlated with multiple sets of stored outputs in said memory, each set of stored outputs, in the multiple sets of stored outputs that are correlated with a respective set of stored inputs, representing a possible correct cycle behavior of said automation component that can result from correct execution of said internal program applied to the respective set of stored inputs;
   before omitting, from said processor, said outputs representing said generated cycle behavior, accessing said memory from said processor and, in said processor, identifying one of said sets of stored inputs that most closely corresponds to said inputs representing said current process state of said process, and comparing said generated cycle behavior in said respective cycle to the correct cycle behaviors of all of said multiple sets of stored outputs that correspond with said identified one set of stored inputs, in order to obtain a comparison result; and
   from said processor, emitting a threat-indicating output signal, which indicates that manipulation of said internal program may have occurred, if said comparison result is that said generated cycle behavior deviates from all of said correct cycle behaviors.

2. The method as claimed in claim 1 comprising implementing said comparing in said processor as a substantially direct comparison between said generated cycle behavior and each of said corrected cycle behaviors.

3. The method as claimed in claim 1 comprising implementing said comparing in said processor by executing a learning phase selected from the group consisting of a fuzzy logic learning phase, a neural network learning phase, and a simulation software learning phase.

4. The method as claimed in claim 1 comprising storing correct cycle behaviors established by said learning phase in said memory in said automation component that is accessible by said processor.

5. The method as claimed in claim 3 comprising storing correct cycle behaviors established by said learning phase in a memory associated with a controller level that is superordinate relative to said processor of said automation component.

6. The method as claimed in claim 1 comprising storing said correct cycle behaviors in said memory with only read access thereto.

7. The method as claimed in claim 1 comprising operating said automation component in cycles having a time duration in a range between 2 ms and 5 minutes.

8. The method as claimed in claim 1 comprising, in said processor, logically linking said threat indicating output signal to independently-established results for a threat situation of other security components associated with said automation component.

9. The method as claimed in claim 8 wherein said output threat indicating signal emitted by said processor automatically provides an alarm at each of said other security components.

10. An automation component that controls a process, said automation component comprising:
    a processor configured to operate said automation component in a plurality of sequential cycles;
    said processor of said automation component being provided with inputs, in each of said cycles, that represent a current process state of said process in that respective cycle;
    upon receipt of said inputs for said respective cycle, said processor being configured to execute an internal program in said processor in order to apply said internal program to said inputs for said respective cycle, and in order to then generate outputs that represent a generated cycle behavior of said automation component in that respective cycle;
    a memory in which a plurality of sets of stored inputs are stored, with each set of stored inputs correlated with multiple sets of stored outputs in said memory, each set of stored outputs, in the multiple sets of stored outputs that are correlated with a respective set of stored inputs, representing a possible correct cycle behavior of said automation component that can result from correct execution of said internal program applied to the respective set of stored inputs;
    said processor being configured to access said memory, before emitting said outputs representing said generated cycle behavior, and said processor being configured to identify one of said sets of stored inputs that most closely corresponds to said inputs representing said current process state of said process, and to compare said generated cycle behavior in said respective cycle to the correct cycle behaviors of all of said multiple sets of stored outputs that correspond with said identified one set of stored inputs, in order to obtain a comparison result; and
    said processor being configured to emit a threat-indicating output signal, which indicates that manipulation of said internal program may have occurred, if said comparison result is that said generated cycle behavior deviates from all of said correct cycle behaviors.

11. The non-transitory, computer-readable storage medium as claimed in claim 10 wherein said programming instructions cause said processor to logically link said threat indicating output signal to independently-established results for a threat situation of other security components associated with said automation component.

12. The non-transitory, computer-readable storage medium as claimed in claim 11 wherein said programming instructions cause said threat indicating output signal emitted by said processor to automatically provide an alarm at each of said other security components.

13. An automation component as claimed in claim 10 comprising:
   at least one sensor in communication with said processor that detects said inputs representing said current state of said process; and
   at least one actuator in communication with said processor that actuates at least a portion of said process dependent on said outputs that represent said generated cycle behavior of said automation component.

* * * * *